Jan. 31, 1967  C. EYRAUD ETAL  3,301,042
METHOD OF DETERMINATION OF THE CHARACTERISTICS OF POROUS
BARRIERS AND INSTRUMENT FOR THE PRACTICAL
APPLICATION OF SAID METHOD
Filed July 9, 1963

INVENTORS
CHARLES EYRAUD
IVAN EYRAUD
MARCEL GAYRAL
PIERRE GILLES
DANIEL MASSIGNON

BY Bacon & Thomas ATTORNEYS 3,301,042
METHOD OF DETERMINATION OF THE CHARACTERISTICS OF POROUS BARRIERS AND INSTRUMENT FOR THE PRACTICAL APPLICATION OF SAID METHOD
Charles Eyraud, Ivan Eyraud, and Marcel Gayral, Lyon, and Pierre Gilles and Daniel Massignon, Paris, France, assignors to Commissariat a l'Energie Atomique, Paris, France
Filed July 9, 1963, Ser. No. 293,730
Claims priority, application France, July 20, 1962, 904,690
3 Claims. (Cl. 73—38)

The present invention has for its object the provision of a method of determining the characteristics of microporous barriers and an instrument for the practical application of said method. The invention is more especially concerned with a method of determining the mean sizes of the pores of porous barriers or of porous filters.

The term "barriers" will be understood in the following description to mean the permeable porous walls which are employed especially in filtration, in the manufacture of catalytic screens, in the separation of isotopes by gaseous diffusion, etc.

The most important characteristic feature of these barriers consists in their mean pore radius. A known method for determining this radius consists in measuring the difference in pressure between the two walls of the barrier as a function of the mean value of the pressures applied to the two faces under continuous flow conditions with respect to a given flow rate. But the methods employed up to the present time had a disadvantage in that they entailed relatively long checking operations.

The present invention provides a simple method which can easily be applied in practice and which permits the rapid comparison of a series of barriers with a standard barrier; the invention is further directed to a measuring instrument for the application of said method.

The invention will become more readily apparent from a study of the following description, one example of practical application of the invention being given therein solely by way of illustration without implied limitation and is described with reference to the accompanying drawings, in which.

Figure 1:
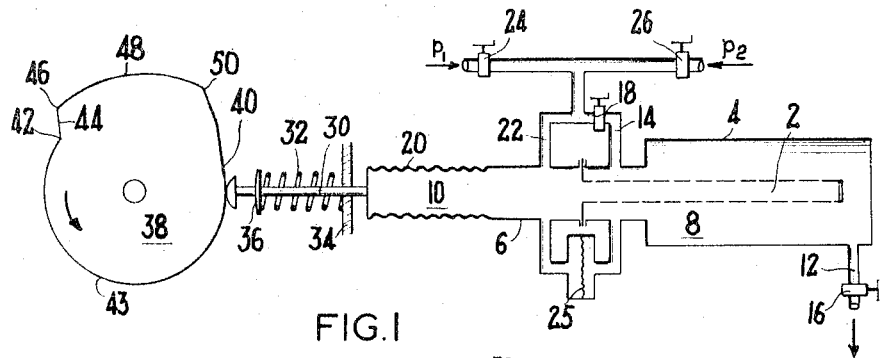
FIG. 1 shows diagrammatically an instrument in accordance with the invention for measuring the characteristics of barriers.

It is known that the permeability of a porous barrier 2 is defined as the ratio of the rate G of flow through a unit surface area of the barrier to the pressure difference $\Delta p$ which exists between the two faces of the membrane. It has been experimentally determined under a wide range of pressures that this permeability $\Gamma$ is proportional to the mean value $\bar{p}$ of the pressures applied on both faces according to the law:

$$\Gamma = A\bar{p} + B \quad (1)$$

in which A and B have been found to vary respectively as the powers 4 and 3 of the mean radius $r$ of the pores which can therefore be expressed in the form:

$$r = K(A/B) \quad (2)$$

Accordingly, when once the constant K has been experimentally determined, it is possible to deduce the mean radius of the pores from the law 2.

The invention proposes a method which makes it possible to determine rapidly two points of the curve $\Gamma = f(\bar{p})$ and hence to deduce the ordinate at the origin, that is to say the permeability $\Gamma_0$ as extrapolated at zero pressure, and the mean radius of the barrier. This is the method which governs the operation of the instrument which will now be described below.

The instrument in accordance with the invention and illustrated in FIG. 1 makes it possible in a minimum time to determine the ordinate at the origin. It is merely necessary for this purpose to take two measurements at mean pressures $\bar{p}_1$ and $\bar{p}_2$.

The barrier 2 to be studied which has a tubular shape in the example which is illustrated is disposed between two chambers 4 and 6 in such manner as to form with the chamber 4 a compartment 8 and with the chamber 6 a compartment 10. The chamber 4 is provided with a pipe 12 for discharge to the atmosphere and a pipe 14 for admission of compressed gas, said pipes being fitted respectively with closure valves 16 and 18. The chamber 6 comprises a rigid portion and a deformable portion 20 which can be, for example, a metallic bellows. There opens into the compartment 10 a conduit 22 which can be connected through valves 24 and 26 to sources which supply gas under the two different pressures $p_1$ and $p_2$. The pipe 14 is branched on the pipe 22 and is supplied through this latter with gas under pressure.

The pressure difference between the compartments 8 and 10 is measured by means of a sensitive manometer 25 which is represented diagrammatically in FIG. 1 by a deformable metallic diaphragm. Another measuring instrument which has not been shown in the drawings can also be provided for the purpose of measuring the mean value of pressures between the two compartments.

The terminal face of the bellows 20 is fitted with a pushrod 30 for the purpose of operating the bellows; an elastic device such as a spring 32 which is compressed between a stationary support 34 and the head 36 of the pushrod 30 tends to thrust back this latter in a direction which corresponds to the expansion of the bellows 20. Said expansion is limited by the abutting contact of the head 36 against the surface of a cam 38.

The cam 38, which is of the rotary type, has a circular portion which is located between two points 40 and 42. As and when said cam rotates, the volume of the compartment 10 remains constant and equal to a predetermined value just as long as the head 36 bears against that arc of said cam 38 which is located between the points 40 and 42 on the portion 40–43–42.

Beyond the point 42, the cam has a slope 44 which terminates at a point 46 and which produces, when the cam rotates in the direction indicated by the arrow in FIG. 1, an abrupt compression of the bellows 20 and consequently a reduction in the volume of the compartment 10 and a correlative increase $\Delta P_0$ in the pressure of the compartment 10, such increase being practically instantaneous if said slope is sufficiently sharp.

Beyond the point 46, the cam has a portion 48 of slightly increasing radius according to a law which will be defined below, said portion 48 terminating at a point 50 at which the cam profile joins the point 40.

The operation of the instrument in accordance with the method as defined above comprises the following stages, after the barrier to be checked has been placed in position.

The valves 18 and 24 are open and the valves 26 and 16 are closed so as to admit the gas under pressure $p_1$ into the two compartments 8 and 10. When the pressure has become stabilized, all the valves are closed and the cam 38 is set in motion.

When the slope 44 of the cam drives the pushrod, the compartment 10 is subjected over a very brief period of time to a reduction in volume which results in an increase in pressure $(\Delta P_0)_1$ which takes place at the moment $t_0$ when the point 46 arrives in front of the pushrod 30. Accordingly, when the cam is given a suitable profile, the time of increase in pressure can be reduced to a few hundredths of a second.

The difference $\Delta p$ between the pressures within the compartments 10 and 8 is measured by the manometer 25 while the portion 48 of the cam 38 continues to drive-in the pushrod 30.

The difference $(\Delta p_1)_1$ at the moment $t_1$ is either noted, recorded or indicated (case of a manual measurement), or stored in a memory system (case of an automatic measurement).

Inasmuch as the time of evolution $t_1-t_0$ is preferably short (a few tenths of a second as a rule) in order to permit of rapid measurement, the manometer 25 must have a short time constant.

Figure 2:
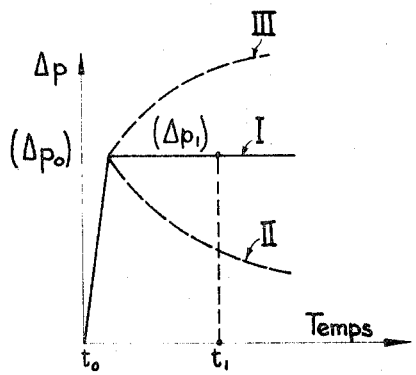
FIG. 2 shows the variation in pressure differential across various membranes which are placed inside the instrument of FIG. 1.

Depending on the permeability of the barrier at the (mean) pressure $\bar{p}_1$ which is substantially constant during the measurement, the variations in the pressure difference $\Delta p$ are represented by a curve of one of the three types which are illustrated in FIG. 2.

Curve 1 corresponds to a standard barrier wherein the flow rate under the pressure difference $(\Delta p_0)_1$ is equal to the variation in volume per unit of time of the compartment 10. Accordingly, any barrier having a different permeability will provide with the same cam a curve of Type II or Type III depending on whether the flow rate is higher or lower than that of the standard barrier.

From the variation $(\Delta p_1)_1-(\Delta p_0)_1$ which is observed between the initial pressure difference $(\Delta p_0)_1$ and the pressure difference $(\Delta p_1)_1$ at the time $t_1$ there can be deduced the difference between the permeability, $\Gamma_1$, of the barrier which is studied and the standard barrier for the corresponding mean pressure $\bar{p}_1$.

The indication or memory-storage of the result of the measurement at the pressure $p_1$ is carried out, for example, by translating pressure differences into potential differences by means of a suitable detector such as a capacitive membrane or inductive pressure-detector.

Now the process of the invention may be utilized to either determine $\Gamma_0$ and $r$ of the barriers to be tested or for the comparison of barriers to a standard barrier. The following relates to the first purpose:

A second measurement which is identical to the first but at a different pressure $\bar{p}_2$ should then be made; and for this purpose the valves 18 and 26 are opened so as to establish the pressure $p_2$ in the compartments 8 and 10. There is then employed a second cam which is similar to the first and which is preferably designed so that the response curve of the standard barrier has the form of curve I.

A single cam can also be employed by giving a suitable profile to the portion 40, 43, 42.

The permeability $\Gamma_0$ which is extrapolated at zero pressure and the mean radius of pores $r$ are deduced from $\Gamma_1$ and $\Gamma_2$, which are the permeabilities corresponding to mean pressures $\bar{p}_1$ and $\bar{p}_2$ by means of the formulae:

$$\Gamma_0 = k_1\Gamma_1 - k_2\Gamma_2 \qquad (3)$$

$$r = \frac{(\Gamma_1 - \Gamma_2)}{(K_1\Gamma_1 - K_2\Gamma_2)} \qquad (4)$$

in which $\Gamma_1$ and $\Gamma_2$ are derived from the variations $(\Delta p_1)-(\Delta p_0)_1$ and $(\Delta p_1)_2-(\Delta p_0)$; $k_1$, $k_2$; $K_1$ and $K_2$ are coefficients which are constant for given operating conditions and are dependent on the nature of the gas employed for the test and on the values of $\bar{p}_1$ and $\bar{p}_2$ and which are experimentally determined once for a given set of tests.

When the instrument is employed for the purpose of sorting those barriers having unsuitable values of the radius $r$ and of permeability $\Gamma_0$, the unsuitable barriers can be discarded either by hand upon reading either or both of the two results $(\Delta p_1)_1-(\Delta p_0)_1$ and $(\Delta p_1)_2-(\Delta p_0)_2$ or automatically by means of an electromechanical device so designed as to make use of these results which are stored in a memory system. If the automatic system is adopted, said system can be carried into effect by incorporating with the instrument the device which has been shown diagrammatically in FIG. 3 and which employs three capacitors so as to operate a quotient meter and a galvanometer relay.

A rotating pin 52 is coupled to the cam 38 and charges the capacitors 54, 56, 58 and 60, at the moment when said pin passes over the stationary contacts 64, 66, 68 and 70 respectively. The pin 52 is connected by a lead 62 and a potentiometer bridge 72 to the output of the manometric detector 25 (as shown in FIG. 1) which is connected to the bridge by a lead 74 which transmits a voltage in direct relation with the pressure differential as indicated above.

Figure 3:
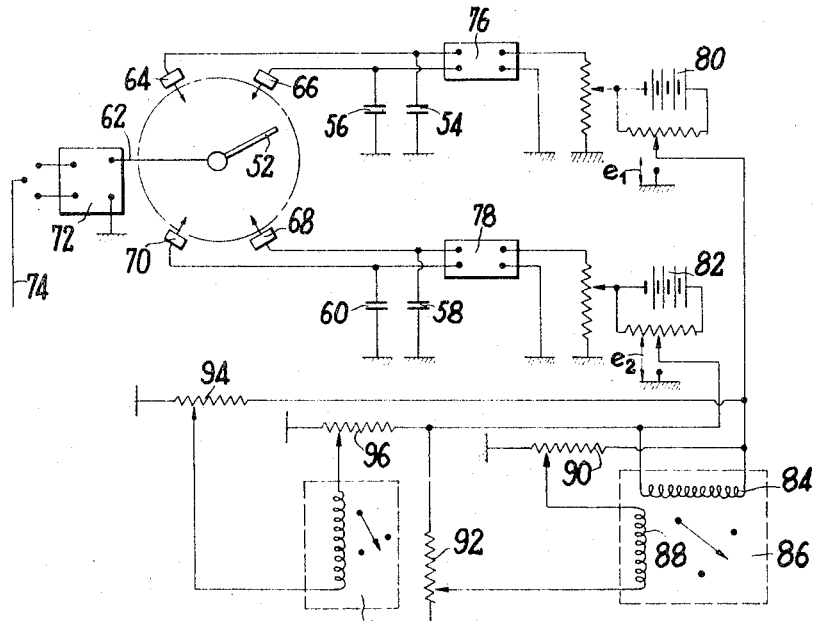
FIG. 3 is a schematic diagram showing a circuit which is designed for the purpose of calculating the characteristics of the barriers and which can be employed in conjunction with the instrument of FIG. 1.

When the pin 52 passes over the contact 64 (at the moment $t_0$ of the measurement), said pin charges the condenser 54 at a voltage which is proportional to the pressure difference $(\Delta p_0)$. As the movement of rotation of the pin 52 continues in the direction of the arrow (as shown in FIGURE 3), said pin passes successively over the contacts 66, 68 and 70 and charges the capacitors 56, 58 and 60 at voltages which are respectively proportional to $(\Delta p_1)_1$, to $(\Delta p_0)_2$ and to $(\Delta p_1)_2$.

The difference in voltage between the capacitors 54 and 56 which is representative of $(\Delta p_0)_1-(\Delta p_1)_1$ is measured by an electronic voltmeter 76 having a high input impedance; a similar voltmeter 78 measures the difference in voltage between the capacitors 58 and 60 which is representative of $(\Delta p_0)_2-(\Delta p_1)_2$.

Each of the voltmeters 76 and 78 is coupled to a circuit 80 or 82, the purpose of which is to supply an output voltage $e$ in such relation with the voltage detected by the voltmeter, which latter voltage is proportional to the corresponding pressure difference $(\Delta p_1)-(\Delta p_0)$ so that $e$ is proportional to the value of permeability $\Gamma=G/\Delta p$.

The difference in the voltages of $e_1$ and $e_2$ which are proportional to $\Gamma_1$ and $\Gamma_2$ respectively, is applied to one of the windings 84 of a contact-type quotient meter 86 while the other winding 88 of said quotient meter is connected to the sliders of divider potentiometers 90 and 92, so that the indication given by the quotient meter is accordingly proportional to the radius $r$ which is given by relation 4.

The difference between the voltages $e_1$ and $e_2$ is also applied by means of divider potentiometers 94 and 96 to the winding of a galvanometer relay 98 which thus provides an indication which is proportional to $\Gamma_0$, as given by relation 3.

An ancillary device, which has not been illustrated in the drawings, classifies the barriers according to the position of the pointers of the quotient meter and the galvanometer relay.

In order to improve the industrial manufacture of microporous filters, it can be of interest to indicate on punched cards or on magnetic tapes the results $(G)/(\Delta p)_1$ and $(G)/(\Delta p_2)$ in order to draw up a statistical record of the distribution of results and to improve production efficiency.

By way of example, the measurement sequences in the instrument which is contemplated in the diagram of FIG. 1 can have the following time-intervals: measurement at the pressure $p_1$: 2.5 seconds, measurement at the pressure $p_2$: 2.5 seconds.

Taking into account the time of fixation and automatic ejection of the barrier, the total measurement requires a maximum time of 10 seconds which are distributed as follows:

Positioning of the barrier: 2 secs.
Build-up of pressure $p_1$: 2.175 secs.
Rotation of the cam for control of $(\Delta p_0)_1$: 0.025 sec.
Rotation of the cam for control of $(\Delta p_1)_1$: 0.300 sec.
Build-up of pressure $p_2$: 2.175 secs.
Rotation of cam for control of $(\Delta p_0)_2$: 0.025 sec.
Rotation of cam for control of $(\Delta p_1)_2$: 0.300 sec.
Ejection and sorting: 3 secs.

Neither the method which has been described in the foregoing nor the instrument which is employed for the practical operation of said method must be interpreted in a limited sense. In particular, it is obvious that the law of variation of the volume of the upstream compartment can be a function of time which is different from that which gives a constant pressure in said compartment.

What we claim is:

1. A method of comparing the permeability of each of a series of porous barriers to a standard porous barrier comprising the steps of interposing a barrier of unknown permeability between two chambers, establishing a stabilized pressure in each of the chambers, applying an abrupt, predetermined variation in volume in one of said chambers to establish a first pressure difference, then slowly varying the volume of the same chamber with respect to time so that the flow rate between the chambers under said first pressure difference is equal to the variation in volume per unit time with respect to said standard barrier, measuring the pressure difference between said chambers for at least one value of the mean pressure between the chambers and comparing said measured pressure difference to said first pressure difference.

2. Apparatus for determining the characteristics of porous chambers comprising a rigid chamber and a chamber which is at least partially deformable communicating with said first chamber, means for removably interposing a porous barrier in the path of communication between said chambers, means for producing equal pressures in said chambers, pressure variation means for successively imposing on the deformable chamber an abrupt predetermined variation in volume and then a slow predetermined variation in volume with respect to time and means for measuring the pressure difference between the said chambers.

3. An apparatus according to claim 2 in which the means for imposing on the deformable chamber an abrupt and then slow variation in volume includes a cam having a pre-determined profile, one portion of said cam being profiled for imposing an abrupt variation in volume and another portion profiled to impose said slow variation in volume with respect to time.

References Cited by the Examiner

UNITED STATES PATENTS

| | | | |
|---|---|---|---|
| 2,352,836 | 7/1944 | Hertel | 73—38 |
| 2,737,804 | 3/1956 | Herzog | 73—38 |

LOUIS R. PRINCE, *Primary Examiner.*

FRANK H. THOMSON, *Assistant Examiner.*